United States Patent
Hossein-Zadeh et al.

(10) Patent No.: US 9,246,529 B2
(45) Date of Patent: Jan. 26, 2016

(54) PHOTONIC RF DOWN-CONVERTER BASED ON OPTOMECHANICAL OSCILLATION

(75) Inventors: Mani Hossein-Zadeh, Albuquerque, NM (US); Kerry J. Vahala, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 2051 days.

(21) Appl. No.: 12/359,897

(22) Filed: Jan. 26, 2009

(65) Prior Publication Data
US 2009/0263137 A1    Oct. 22, 2009

Related U.S. Application Data

(60) Provisional application No. 61/062,340, filed on Jan. 25, 2008.

(51) Int. Cl.
| | | |
|---|---|---|
| H04B 10/67 | (2013.01) | |
| H04B 1/30 | (2006.01) | |
| G02F 1/01 | (2006.01) | |
| G02F 1/21 | (2006.01) | |
| G02F 2/00 | (2006.01) | |

(52) U.S. Cl.
CPC ............... H04B 1/30 (2013.01); *G02F 1/0128* (2013.01); *G02F 1/21* (2013.01); *G02F 2/002* (2013.01); *G02F 2203/055* (2013.01); *G02F 2203/15* (2013.01); *H04B 2210/006* (2013.01)

(58) Field of Classification Search
USPC ................................................. 398/207, 212
See application file for complete search history.

(56) References Cited

U.S. PATENT DOCUMENTS

| 7,236,664 B2 | 6/2007 | Martin et al. |
| 7,415,178 B2 * | 8/2008 | Montgomery et al. ......... 385/39 |
| 7,982,944 B2 * | 7/2011 | Kippenberg et al. ......... 359/330 |
| 2004/0179573 A1 | 9/2004 | Armani et al. |
| 2005/0123306 A1 * | 6/2005 | Ilchenko et al. ............... 398/161 |
| 2008/0075464 A1 * | 3/2008 | Maleki et al. ................... 398/85 |
| 2008/0159683 A1 * | 7/2008 | Smith et al. ..................... 385/12 |

OTHER PUBLICATIONS

M. Hossein-Zadeh, and A.F.J. Levi, "14.6GHz LiNbO3 Microdisk Photonic Self-homodyne RF Receiver," IEEE Transactions on Microwave Theory and Techniques, vol. 54. pp. 821-831 (2006).

* cited by examiner

Primary Examiner — Shi K Li
(74) Attorney, Agent, or Firm — Steinfl & Bruno LLP

(57) ABSTRACT

An all optical radio frequency converter. The invention relates to a microtoroid optomechanical oscillator that can provide a local oscillation frequency and a mixing functionality. The microtoroid optomechanical oscillator can be fabricated from a silica-on-silicon wafer. When an input optical signal having an optical carrier frequency carrying a modulated RF signal representing information is applied to the microtoroid optomechanical oscillator, a signal including the baseband information modulated on the optical carrier is provided as output. The output signal can be detected with a photodetector. Information carried by the optical signal can be recorded and/or displayed to a user. Injection locking of the microtoroid optomechanical oscillator can be accomplished by providing a signal of suitable frequency. The frequency and the phase of operation of the microtoroid optomechanical oscillator can be locked to the respective frequency and phase of the injected locking signal.

7 Claims, 8 Drawing Sheets

PHOTONIC RF DOWN-CONVERTER BASED ON OPTOMECHANICAL OSCILLATION

CROSS-REFERENCE TO RELATED APPLICATIONS

This application claims priority to and the benefit of U.S. provisional patent application Ser. No. 61/062,340, filed Jan. 25, 2008, which application is incorporated herein by reference in its entirety.

STATEMENT REGARDING FEDERALLY FUNDED RESEARCH OR DEVELOPMENT

The U.S. Government has certain rights in this invention pursuant to Grant No. N66001-07-1-2051|awarded by the Defense Advanced Research Projects Agency.

FIELD OF THE INVENTION

The invention relates to RF frequency converters in general and particularly to an RF frequency converter that employs a single optical component that can provide both a local oscillation frequency (e.g., a local oscillator) and a mixing function (e.g., a nonlinear element).

BACKGROUND OF THE INVENTION

In an electronic homodyne receiver known in the prior art (as shown in FIG. 1(a)) a baseband signal provided using an RF carrier is down-converted from the RF carrier by mixing the received signal with a signal from a local oscillator (LO) that has the same frequency as the RF carrier ($f_{RF}$). The mixing occurs in an RF mixer through the nonlinearities of electronic elements (such as diodes and transistors). The LO also uses electronic components as well as an electromechanical reference resonator such as a quartz crystal.

Today many RF communication links use an optical carrier to improve the bandwidth, reduce the loss and the overall cost by replacing bulky RF cables with thin optical fibers. In these links (also known as RF sub-carrier optical links) the data modulated RF carrier is up-converted to optical frequencies. The RF signals transported using optical frequencies (as the carrier) require conversion to electrical signals before processing. After conversion to electronic domain conventional electronic technology is used to process the RF signal. It is desirable to perform the required RF signal processing in optical domain in order to avoid the extra loss, cost and complexity associated with optical-to-electrical conversion. Moreover an all-optical communication system has the extra benefit of isolation from external electromagnetic radiation. As a result an all-optical link is not susceptible to electromagnetic noise and it is very secure (since it is not accessible wirelessly).

There is a need for an all-optical RF frequency converter that would eliminate the need to convert optical signals to electrical signals prior to processing those signals.

SUMMARY OF THE INVENTION

In one aspect, the invention relates to an all-optical RF frequency converter. The all-optical RF frequency converter comprises a microtoroid optomechanical oscillator configured to provide a local oscillation frequency and configured to provide a mixing functionality. The microtoroid optomechanical oscillator has an optical input port configured to receive an optical signal having an optical frequency carrier and an RF frequency sub-carrier that carries a lower frequency single-tone, modulated thereon, and an optical output port configured to provide an optical signal modulated with the low frequency single-tone without the RF carrier. The low-frequency single tone is down converted from the RF carrier through optomechanical oscillation and mixing when the RF sub-carrier frequency is equal to the optomechanical oscillation frequency.

The microtoroid resonator provides the local oscillation frequency through optomechanical interaction between the optical resonance and the mechanical mode of the resonator structure. The mixing function that is responsible for down-conversion is provided by the nonlinear optical transfer function of the optical resonance.

In one embodiment, the optical input port configured to receive an optical signal is an optical input port configured to receive an optical signal that comprises an injection frequency component that is configured to lock at least one of a frequency and a phase of the microtoroid optomechanical oscillator to a respective at least one of a frequency and a phase of the injection frequency component. In one embodiment, in response to the provision of an optical signal comprising an injection frequency component that is configured to lock at least one of a frequency and a phase of the microtoroid optomechanical oscillator to a respective at least one of a frequency and a phase of the injection frequency component at the optical input port, the microtoroid optomechanical oscillator is constrained to operate at a respective at least one of a frequency and a phase of the injection frequency component.

In one embodiment, the microtoroid optomechanical oscillator comprises silica.

In one embodiment, the all-optical RF frequency converter is provided in combination with a signal source configured to provide a signal representing information to the input port of the microtoroid optomechanical oscillator, the signal comprising an optical carrier frequency and information provided in an RF signal having a RF carrier and baseband frequency where the RF carrier frequency is equal to an optomechanical oscillation frequency of the microtoroid optomechanical oscillator; a photodetector having a bandwidth matched to the baseband frequency, the photodetector configured to receive an output signal from the output port of the microtoroid optomechanical oscillator, and configured to provide as output an electrical signal representative of the information; and an electrical apparatus configured to receive the electrical signal representative of the information and configured to perform a selected one of recording the information and displaying the information.

In one embodiment, the all-optical RF frequency converter is configured to receive an optical signal having an optical frequency carrier and an RF frequency sub-carrier that carries a lower frequency single-tone representing information modulated thereon. The all-optical RF frequency converter is present in combination with a photodetector having a bandwidth matched to the baseband frequency, the photodetector configured to receive an output signal from the output port of the microtoroid optomechanical oscillator, and configured to provide as output an electrical signal representative of the information; and an electrical apparatus configured to receive the electrical signal representative of the information and configured to perform a selected one of recording the information and displaying the information. In one embodiment, the all-optical RF frequency converter is present in combination with the photodetector and the electrical apparatus, wherein the combination comprises an RF receiver:

The invention relates to a microtoroid optomechanical oscillator that can provide a local oscillation frequency and a mixing functionality. The microtoroid optomechanical oscillator can be fabricated from silica-on-silicon wafer. When an input optical signal having an optical carrier frequency that is modulated with an RF signal (comprising an RF carrier and a lower baseband frequency component representing information) is applied to the microtoroid optomechanical oscillator, an optical signal modulated by the baseband frequency (information) is provided as output. This all-optical down-conversion occurs when the frequency of the optomechanical oscillator matches that of the RF carrier in the RF signal. The output signal can be detected with a photodetector where the higher RF frequency components are automatically filtered by the slow response of the photodetector and only the baseband is provided as an electronic signal and can be recorded and/or displayed to a user. Injection locking of the microtoroid optomechanical oscillator can be accomplished by providing a signal of suitable frequency. The frequency and the phase of operation of the microtoroid optomechanical oscillator can be locked to the respective frequency and phase of the injected locking signal. The injection locking feature may relax the frequency stability requirement for the oscillator within the lock range.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

We have demonstrated all-optical RF down-conversion in a silica microtoroid optomechanical oscillator. The results that we have obtained show that the optomechanical oscillator can simultaneously serve as an RF mixer and as an RF local oscillator in a photonic homodyne RF-receiver architecture. In addition, we have also demonstrated that injection locking of a radiation-pressure optomechanical oscillator (OMO) can be accomplished through external modulation of the optical pump power near the optomechanical oscillation frequency. It is shown that the frequency and phase of a microtoroidal optomechanical oscillator can be locked to those of an electronic oscillator (or any other signal) that can modulate the optical input power and whose frequency is within the lock range. As a result we have demonstrated the necessary functions for realization of an all-optical homodyne RF receiver. The optomechanical RF oscillator provides the local oscillation and the nonlinearity required for RF frequency mixing. Demonstration of injection locking verifies that the optomechanical oscillation will be naturally locked (both in phase and frequency) to the RF carrier in the received signal and therefore the mixing process can reliably down-convert the baseband information carried by the RF carrier.

Photonic processing of radio frequency (RF) signals using active and passive optical devices is an emerging technology with a wide range of applications in RF-over-fiber communication systems and photonic RF-receiver modules. Recently the observation of self-sustained optomechanical oscillation in silica microtoroids has created new possibilities for designing RF-photonic devices. Through detailed experimental and theoretical studies, we have studied the fundamental properties of these oscillators. However, heretofore optomechanical oscillation has not been employed in any RF-photonic device and its applications have been limited to a platform for studying fundamental physical phenomena. Here we demonstrate a configuration where the optomechanical (OM) oscillator can serve as an RF-frequency down-converter in the optical domain. Our observed results show that an OM oscillator can simultaneously function as the nonlinear element and the local oscillator (LO) to down-convert the baseband signal from a standard suppressed-carrier RF signal. It is anticipated that the optomechanical down-converter can provide an all-optical replacement for its electronic counterparts.

Photonic Homodyne RF Down-Conversion

Figure 1A:
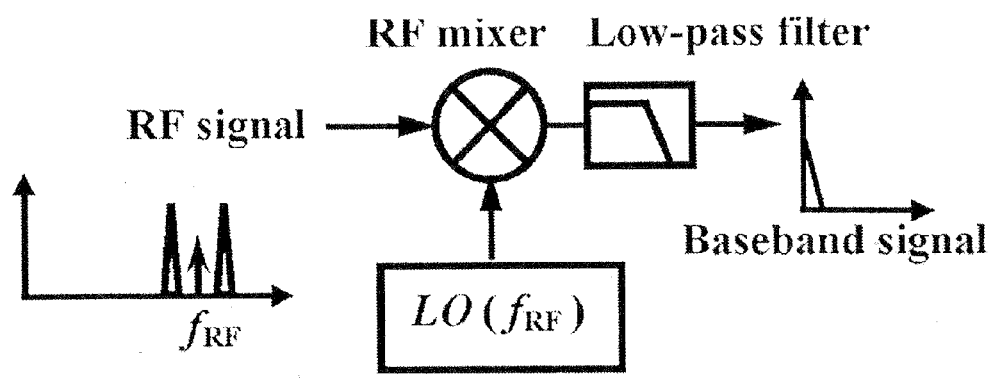
FIG. 1(a) is a schematic diagram of a standard electronic homodyne RF down-converter known in the prior art.
Figure 1B:
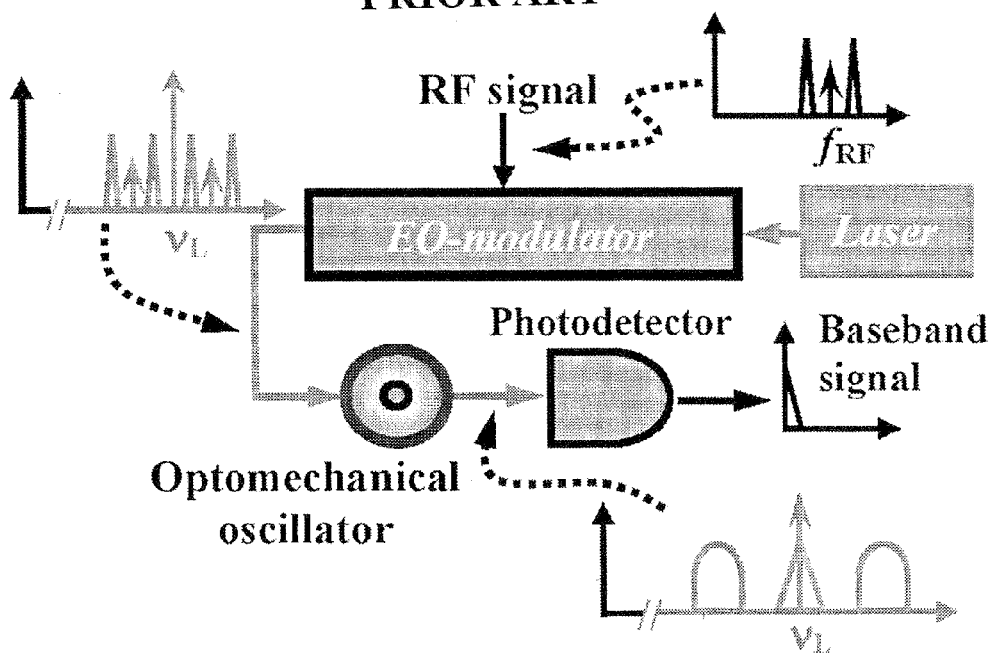
FIG. 1(b) is a schematic diagram of an embodiment of a photonic RF down-converter based on a microtoroidal optomechanical oscillator that operates according to principles of the invention, and illustrating the RF/optical spectrum of the signal while it flows through the system (as indicated by dotted arrows at specific points in the RF down-converter).

In the architecture illustrated schematically in FIG. 1(b) the received RF signal modulates the amplitude of an optical carrier ($v_L$~194 THz) in an electro-optic modulator. The modulated optical wave is then fed to a microtoroidal silica resonator and finally the transmitted optical power is detected in a photodetector with a bandwidth matched to the baseband frequency. Suitable silica microtoroids are made in our lab in a small clean-room facility using the methods developed in Professor Vahala's research group in the Applied Physics Department at the California Institute of Technology and described in U.S. Pat. No. 7,236,664, and United States Patent Application Publication No. 20040179573 A1, each of which patent documents is incorporated herein by reference in its entirety.

When the optical input power ($P_{in}$) to the microtoroid is larger than the threshold power for self-sustained OM oscillations and the OM oscillation frequency (f) is equal to the RF-carrier frequency ($f_{RF}$), the optical mixing inside the microtoroid generates a baseband component on the optical carrier and therefore, upon detection, the photocurrent will be baseband modulated. The high-frequency RF components are filtered out through the slow response of the photodetector. In other words, the OM oscillation combined with the nonlinear optical transfer function of the microtoroid (Lorentzian) reproduce the combined function of the LO and the mixer in an electronic down-converter of the prior art, such as that shown in FIG. 1(a). Note that the bandwidth of the loaded optical resonance imposes an upper limit on the maximum frequency of the baseband signal. In the embodiment described, the selected optical mode of the microtoroid has an intrinsic and loaded optical quality factor of $1 \times 10^7$ and $0.5 \times 10^7$, respectively. The mechanical mode has a frequency of 25.11 MHz and quality factor of about $Q_{mech}$~4000.

Figure 2:
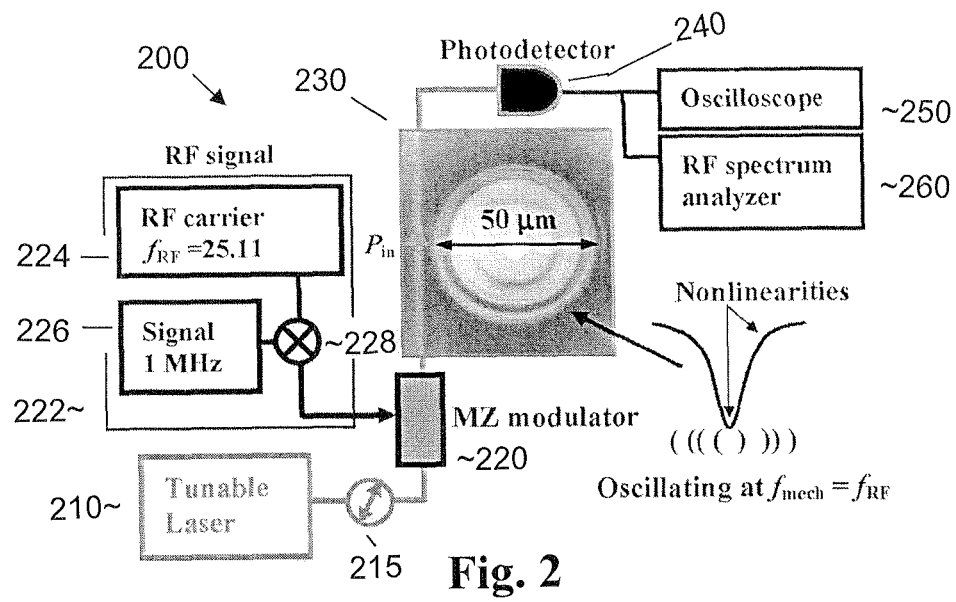
FIG. 2 is a schematic diagram of an embodiment of the photonic RF down-converter with the associated equipment used in demonstrating its operation.

FIG. 2 is a schematic diagram 200 of an embodiment of the photonic RF down-converter with the associated equipment used in demonstrating its operation. In operation, the apparatus of FIG. 2 uses a laser 210 (which preferably is a tunable laser) and a tuning element 215 (for example a Fabry-Perot cavity) to provide an optical carrier wave at a desired frequency to a Mach-Zehnder (MZ) modulator 220. A suitable laser 210 is the Velocity™ Laser System (1520-1570 nm) Model TLB-6328 available from New Focus, 2584 Junction Avenue, San Jose, Calif. 95134. A signal generator 222 provides an RF signal which is used as a test signal. A suitable signal generator 222 is the 33250A Function/Arbitrary Waveform Generator, 80 MHz available from Agilent, 5301 Stevens Creek Blvd, Santa Clara Calif. 95051. The signal generator 222 in one embodiment comprises an RF carrier signal generator 224 operating at 25.11 MHz and a signal generator 226 operating at 1 MHz that provide signals which are combined in a mixer 228. A suitable mixer 228 is the ZEM-2B available from Mini Circuits, P.O. Box 350166, Brooklyn, N.Y. 11235-0003. The optical carrier wave from the laser is modulated in the MZ by using the RF signal from the signal generator 222 as a modulation input to the MZ. The modulated optical carrier, now including the RF signal modulation, is provided to an input of the silica microtoroid 230. The silica microtoroid 230 provides an output signal to an optical input of a photodetector 240. The photodetector 240 provides an electrical signal at an electrical output. A suitable photodetector 240 is the 1811-FS (125 MHz InGaAs detector) available from New Focus. The electrical signal from the photodetector 240 is received and displayed by an RF oscilloscope 250, and is also received and analyzed by an RF spectrum analyzer 260. A suitable RF oscilloscope 250 is the Model TDS 2024B available from Tektronix, 14200 SW Karl Braun Drive Beaverton, Oreg. 97077. A suitable RF spectrum analyzer 260 is the 8561E RF Spectrum Analyzer available from Agilent. The RF oscilloscope 250 and the RF spectrum analyzer 260 can record, display, or otherwise provide to a user information about the signal that the photodetector 240 provides as output, including frequency, amplitude and phase information. It will be understood that in a real application, such as communicating information over an optical fiber, the signal generator 222 will be replaced by a signal source representing a source of information that one wishes to send over the fiber. The information will be used to modulate an optical carrier. The modulated optical carrier will be sent over the fiber. At the point along the fiber that one wishes to receive the signal, the signal will be sent to an input port of a silica microtoroid embodying the principles of the invention, and the RF carrier will be removed by down-conversion, leaving the information signal. The information signal will then be detected by a suitable detector and converted to an electrical signal that can be recorded or displayed to a user, or otherwise enunciated.

In the demonstration of the operation of the microtoroid that has been performed, the RF signal is an RF carrier (25.11 MHz) modulated by a single-tone (1 MHz) baseband signal (with suppressed carrier modulation format). This signal modulates the output of a tunable laser (λ~1550 nm) in a Mach-Zehnder (MZ) modulator. The modulated optical power is then coupled to a silica microtoroid resonator using a fiber-taper and the transmitted optical power is detected in a photodetector. An oscilloscope and an RF spectrum analyzer are used to control the optical detuning and analyzing the spectrum of the detected power.

Figure 3:
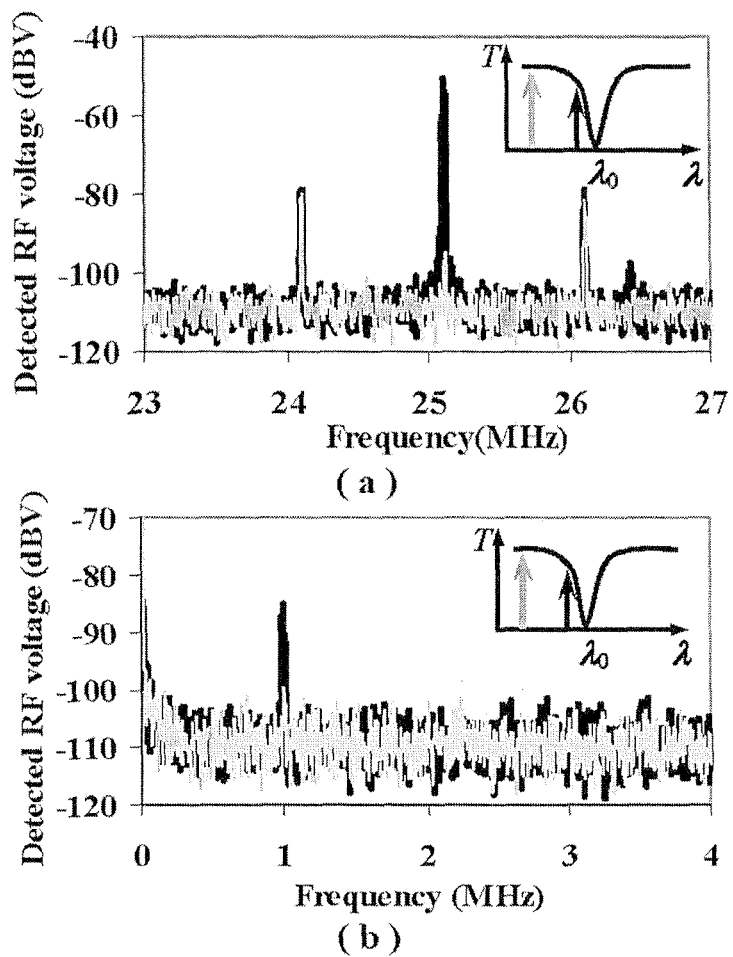
FIG. 3(a) is a graph of the off-resonance (gray) and on resonance (black) RF spectrum of the transmitted optical power near $f_{RF}$.
FIG. 3(b) is a graph of the off-resonance (gray) and on resonance (black) RF spectrum of the transmitted optical power near the baseband frequency.

The threshold optical input power for self-sustained OM oscillations ($P_{th}$) is 120 µW and the mechanical mode has a frequency of $f_{mech}$=25.11 MHz. FIGS. 3(a) and 3(b) show the RF spectrum of the transmitted optical power while the laser is tuned off resonance (gray line) and on resonance (black line). The insets show the relative detuning of the laser wavelength and the optical resonance for each case (T is the transmitted optical power). The optical input power to the fiber-taper is 270 µW. If the laser wavelength is tuned off-resonance the modulated optical wave is transmitted through the fiber-taper without being coupled to the microtoroid and the RF spectrum of the detected optical power is identical with the spectrum of a suppressed carrier modulated RF wave (e.g., the signal that is driving the MZ modulator). When the laser is tuned inside the optical resonance, the circulating optical power in the microtoroid initiates the self-sustained OM oscillation. OM oscillation modulates the amplitude of the optical wave and boosts the modulated RF power at 25.11 MHz (FIG. 3(a)). Meanwhile since the laser is tuned to the nonlinear section of the optical transfer function, the oscillation mixes with the RF-sidebands (25.11±1 MHz) and down converts the single tone baseband (FIG. 3(b)). In this demonstration, the down-conversion efficiency (defined as the ratio of baseband optical power to the sum of optical powers at each RF-sideband) is about 15%. Note that the efficiency of the optomechanical RF-down-conversion is directly proportional to the optical input power, as well as the optical and mechanical quality factors. Preliminary calculations show that in an optimized device this efficiency can be as large as 50%. The phase noise of the down-converted signal can be dominated either by the optomechanical oscillator phase noise or by the phase noise of the carrier frequency in the received RF signal depending on their relative magnitudes (the larger one dominates). Note that at room temperature the phase noise of the optomechanical oscillator is limited by thermal noise in the microtoroid structure and it scales inversely with mechanical quality factor ($Q_{mech}$).

Nonlinearity of the Oscillation

Figure 4:
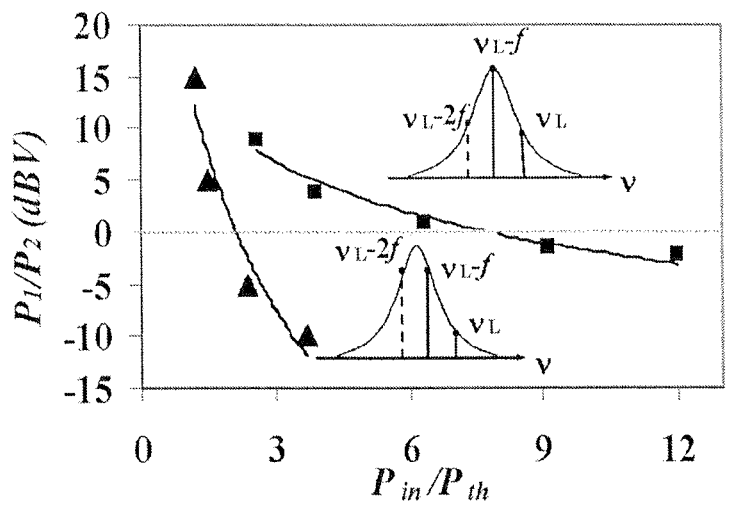
FIG. 4 is a graph that illustrates the behavior of the ratio of the detected power at the fundamental optomechanical frequency (f) of two different silica microtoroids and the second-harmonic (2f) plotted as a function of $P_{in}/P_{th}$.

The amplitude of self-sustained oscillation and the nonlinearity of the optical transfer function are the two key elements in the down-conversion process. For each microtoroid, the amplitude of OM oscillation is determined by the ratio $P_{in}/P_{th}$ and the laser detuning from resonance ($\Delta\nu = \nu_L - \nu_0$). The detuning which maximizes the oscillation amplitude depends on intrinsic properties of the microtoroid as well as optical coupling. The detuning also determines the segment of the Lorentzian response that is used for transmission and therefore controls the strength of the nonlinear behavior. For optimized down-conversion it is desired to have the maximum OM gain at a detuning that also results in maximum nonlinear behavior. Experimental results show that typically the optimized detuning is about 60-80% of the loaded linewidth of the optical resonance. Here we use the strength of the second harmonic component in the spectrum of the detected optical power from the OM oscillator as a measure for the mixing efficiency (using the square-law mixer approximation). FIG. 4 shows the ratio of the detected power at the fundamental OM frequency ($P_1$) and its second-harmonic ($P_2$) plotted against $P_{in}/P_{th}$. The two sets of data correspond to two different microtoroids with different loaded optical-$Q_S$ ($Q_L$) and mechanical frequencies (f). The insets show the alignment of the laser frequency and the lower sidebands ($\nu_L$, $\nu_L-f$, $\nu_L-2f$) relative to the optical mode lineshape function for each case. Note that the upper sidebands, $\nu_L+f$ and $\nu_L+2f$, are filtered out by the transfer function. For each microtoroid, the laser detuning from resonance ($\Delta\nu = \nu_0 - \nu_L$) is optimized for maximum value of ($P_1/P_2$). One observes that increasing $P_{in}/P_{th}$ drives the oscillator to the nonlinear regime. The difference between these two cases can be explained by the fact that the relative amplitude of the OM sidebands are modified through the Lorentzian response of the cavity, as shown in the insets in FIG. 4.

For the first case illustrated in FIG. 4, shown by the curve having data points represented by rectangles, the second harmonic is suppressed by the low frequency tail of the Lorentzian while for the second case (shown by the curve having data points represented by triangles) the fundamental frequency and the second harmonic coexist within the optical resonance. This measurement is a proof for the possibility of strong oscillation in the nonlinear regime and hence efficient mixing. It also shows that for each microtoroid there are optimal values of $P_{in}/P_{th}$ and $Q_L$ that should be used for optomechanical RF mixing process.

Frequency Switching

Figure 5:
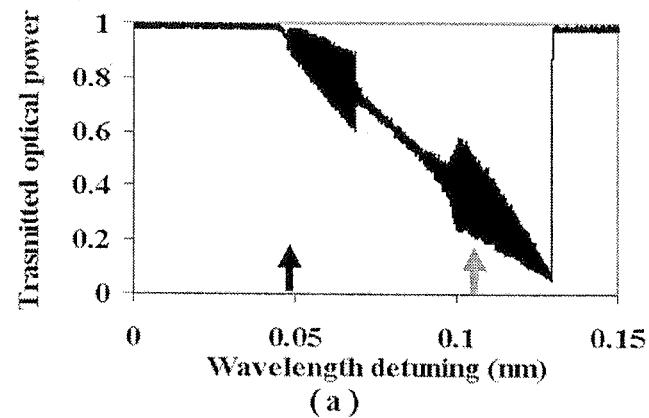
FIG. 5(a) is a graph that shows the normalized transmission spectrum near a high-Q optical mode.
FIG. 5(b) is a graph that shows the RF spectrum of the detected optical output power for two optomechanical oscillation frequencies.
Figure 5:
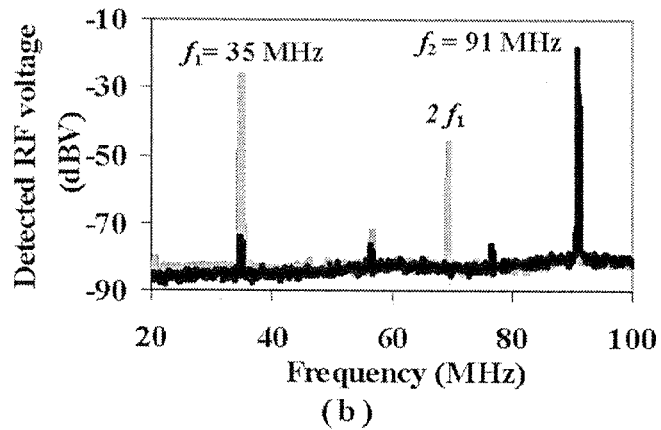

Usually at a given optical input power and optical coupling strength the microtoroid oscillates at one of its mechanical eigenmodes. However, by tailoring the geometry of the microtoroid and adjusting the loaded-Q, the OM oscillation frequency can be switched by changing the wavelength detuning from resonance. To demonstrate this possibility we have chosen a different microtoroid with fundamental and $3^{rd}$ mechanical eigen-frequencies of 35 MHz and 91 MHz, respectively. FIG. 5(a) shows the transmitted optical power as the laser wavelength is slowly swept (10 sweeps/sec) through the resonant wavelength. The triangular shape of the transmission (as opposed to a Lorentzian) is an artifact of the thermo-optical resonant shift in conjunction with the slow scan rate. The dark broadened regions in the wavelength scan correspond to optical detuning wavelengths at which the OM gain overcomes the mechanical loss and the ensuing regenerative OM oscillation modulates the optical power. As shown in FIG. 5(a), the OM oscillation occurs at two distinct detuning wavelength ranges. The loaded-Q of the selected resonance is $1.5 \times 10^6$. RF spectrum analysis of these oscillations shows that they correspond to two mechanical modes of the microtoroid, at 91 MHz and 35 MHz. FIG. 5(b) shows the RF spectrum of the detected optical output power while the laser wavelength is tuned to two different wavelengths indicated by the arrows on FIG. 5(a). The black and gray arrows in FIG. 5(a) correspond respectively to the black and gray traces in FIG. 5(b). This degree of freedom could be useful in the context of the optomechanical RF down-converter since it enables data down-conversion from two distinct carrier frequencies only by tuning the laser wavelength within the optical resonance.

We have demonstrated a photonic RF down-conversion technique based on self-sustained optomechanical oscillations in a silica microtoroid. Note that previously a self-homodyne RF photonic receiver was demonstrated based on nonlinear modulation in an electro-optic microdisk, as described in M. Hossein-Zadeh, and A. F. J. Levi, "14.6 GHz $LiNbO_3$ Microdisk Photonic Self-homodyne RF Receiver," IEEE Transactions on Microwave Theory and Techniques, vol. 54, pp. 821-831 (2006). However in that architecture the local oscillator is eliminated by using transmitted carrier modulation format and as a result it suffers from low power efficiency as well as incompatibility with standard RF transceivers for long distance communication. In contrast the dual functionality of the optomechanical oscillator (oscillator/mixer) makes it compatible with suppressed carrier modulation format.

Injection Locking

Injection locking is a well-known effect in both self-sustained electronic and photonic oscillators (e.g., lasers). When a periodic signal with a frequency close to the oscillation frequency and large enough amplitude is injected into a self-sustained oscillator, the phase and frequency of the oscillator can be locked to that of the injected signal.

We now describe this phenomenon in an optomechanical oscillator (OMO). OMOs are driven by radiation pressure and rely upon "dynamic back action" created when a continuous-wave (cw) optical pump is blue-detuned (e.g., detuned to the short wavelength side) relative to a resonance of an optical resonator that also features high-Q mechanical modes. The OMOs of this study are based on high-Q silica microtoroids. The efficient coupling between optical and mechanical degrees of freedom through radiation pressure in silica microtoroids leads to self-sustained RF mechanical oscillations of the microtoroid structure, even to GHz frequencies. Characterization of the phase noise and oscillation frequency have confirmed that the microtoroid OMO is potentially important in certain RF-photonic systems. We have demonstrated that partial amplitude modulation of the optical input power can lock both frequency and phase of the optomechanical oscillation to that of the external oscillator. The results described herein show that injection locking in an OMO exhibits the characteristics of injection locking in electronic oscillators.

Figure 6:
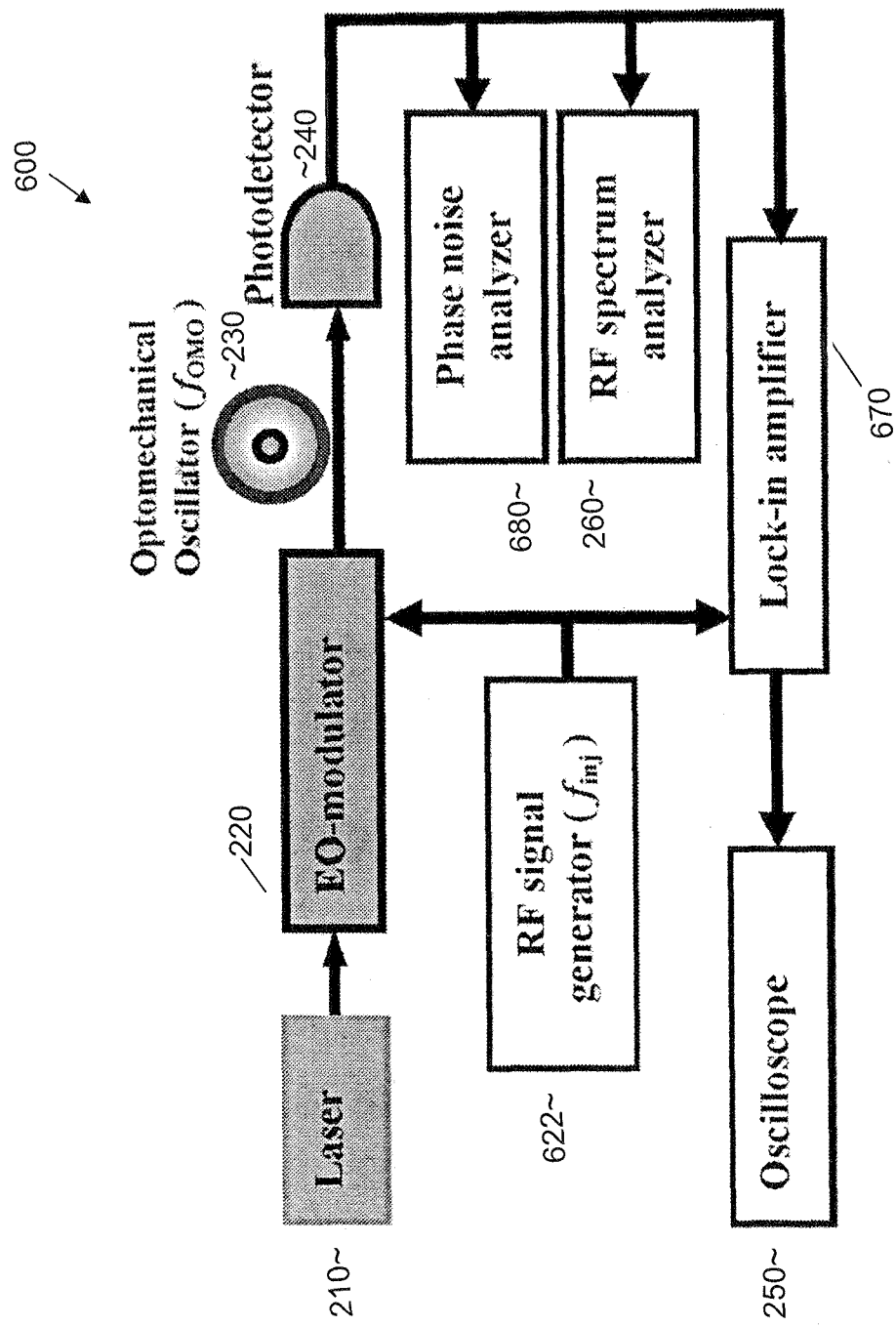
FIG. 6 is a schematic diagram of an embodiment of an experimental arrangement used to study injection locking in a microtoroid optomechanical oscillator that operates according to principles of the invention.

FIG. 6 shows a schematic diagram 600 of an embodiment of the experimental arrangement used to study injection locking in the microtoroid optomechanical oscillator. The optical power from a tunable laser 210 passes through a Mach-Zehnder (MZ) modulator 220 (electro-optic, or EO-modulator) and is coupled into and out-of the microtoroid optical resonator 230 using a fiber-taper coupler. The amplitude of the optical input power ($P_{in}$) is partially modulated by a single tone RF signal from a tunable RF synthesizer (RF signal generator 622) applied on the MZ modulator. A suitable RF generator 622 is the N5181A MXG Analog Signal Generator available from Agilent. The modulation index is thereby used to control the strength of the weaker injection-locking signal (modulated fraction of $P_{in}$) in comparison to the pump signal (cw fraction of $P_{in}$). The spectrum of optical power that is coupled out of the microtoroid is then analyzed in an RF spectrum analyzer 260. Also, the phase of the output signal is compared to that of the electronic input signal (injected signal) using a lock-in amplifier 670. When the amplitude of the injected signal is large enough and its frequency ($f_{inj}$) is close to optomechanical oscillation frequency ($f_{OMO}$), we observe injection locking of the optomechanical oscillator. The phase optical power that is coupled out of the microtoroid is analyzed in a phase noise analyzer 680. An oscilloscope 250 is used to display information provided by the lock-in amplifier 670.

Figure 7:
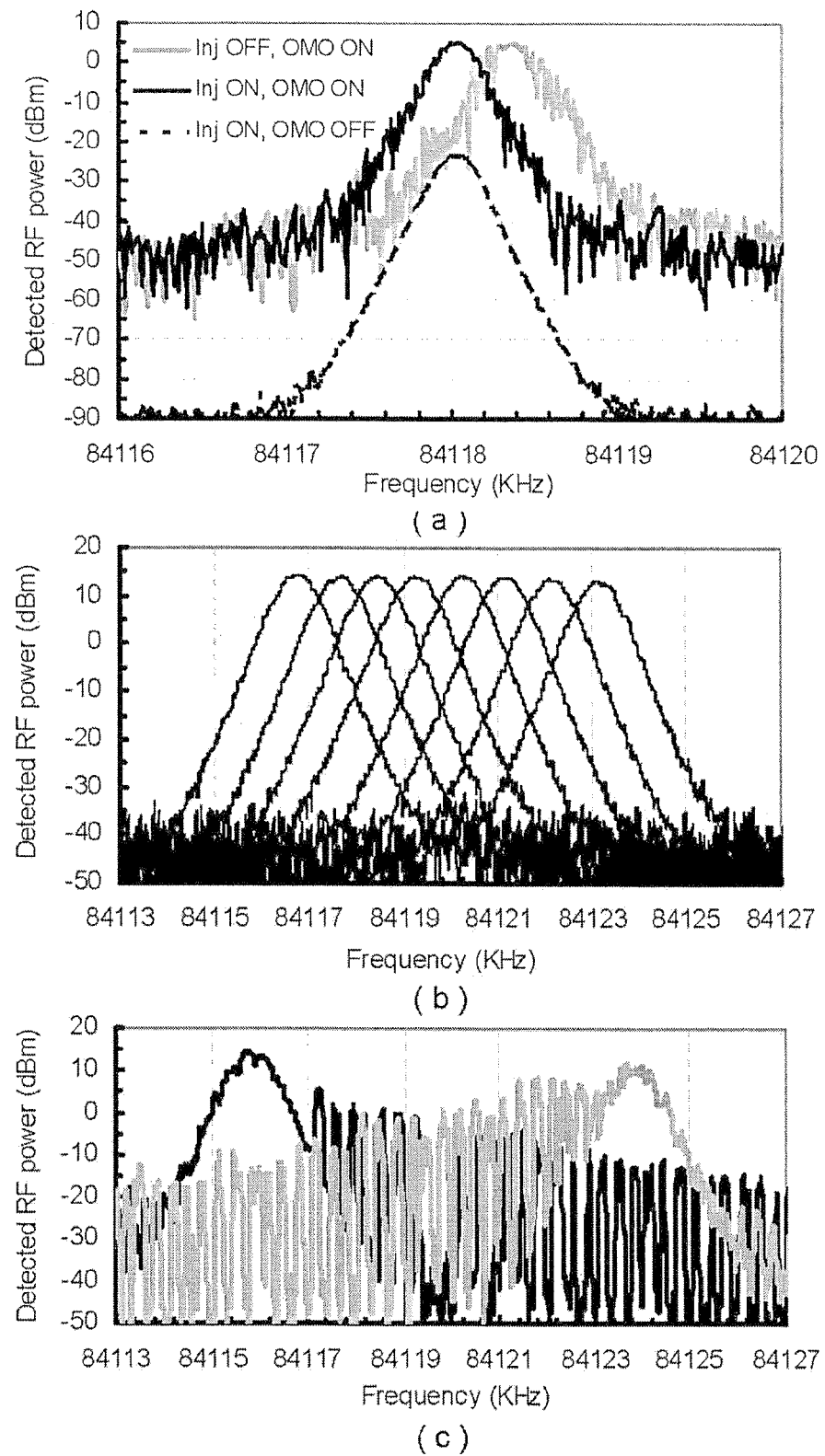
FIG. 7(a) is a graph of an RF spectrum of the optical output power in the presence (black) and absence (gray) of the injection signal, for a microtoroidal optomechanical oscillator that operates according to principles of the invention. The dashed trace is the spectrum of the optical input power.
FIG. 7(b) is a graph of an RF spectrum of the optomechanical oscillation tuned by an injection signal.
FIG. 7(c) is a graph of an RF spectrum of the detected optical power while the frequency of the external modulation (injection signal) is tuned slightly above and below the lock range (quasi-locked regime).

FIG. 7(a) shows the RF spectrum of the optical output power in the absence (gray trace) and presence (black trace) of modulation (injection). The microtoroid OMO chosen for this experiment had a mechanical frequency of about 84.120 MHz. In this case the frequency of the injected signal is 500 Hz smaller than the optomechanical oscillation frequency. The dashed trace is the RF spectrum of the optical input power when the external modulation is ON. In all experiments the laser power and amplitude modulation depth are chosen such that the cw optical input power is larger than the threshold power for optomechanical oscillation ($P_{th}$) but small enough to keep the oscillation in the linear regime (where the second harmonic is at least 15 dB smaller than the fundamental frequency). It is apparent, that the presence of the modulation pulls $f_{OMO}$ toward $f_{inj}$ and locks the two signals. As shown in FIG. 7(b) injection locking can be used to tune the optomechanical oscillation frequency simply by tuning $f_{inj}$. At a given ratio between modulation amplitude of the input signal and amplitude of the optomechanical oscillation imposed on the optical output ($A_{inj}/A_{OMO}$), locking occurs within a limited bandwidth around $f_{OMO}$ (known as lock range). Similar to an electronic oscillator, for tuning slightly above and below the edge of lock range the oscillator is quasi-locked and the RF spectrum comprises a series of closely spaced decaying beat frequencies in the vicinity of $f_{OMO}$, as shown in FIG. 7(c).

Based on the theoretical prediction using the general theory of injection locking for self-sustained oscillators, the lock range can be written as:

$$\Delta f_{lock} = \Delta f_{mech} \times \frac{A_{inj}}{A_{OMO}} \times \left(1 - \left(\frac{A_{inj}}{A_{OMO}}\right)^2\right)^{-1/2} \quad \text{Eq. (1)}$$

where $\Delta f_{mech}$ is the intrinsic linewidth of the passive mechanical resonator (tank). Note that beyond the lock range the phase difference between optomechanical oscillation and the injected signal becomes random and the two signals are unlocked.

Figure 8:
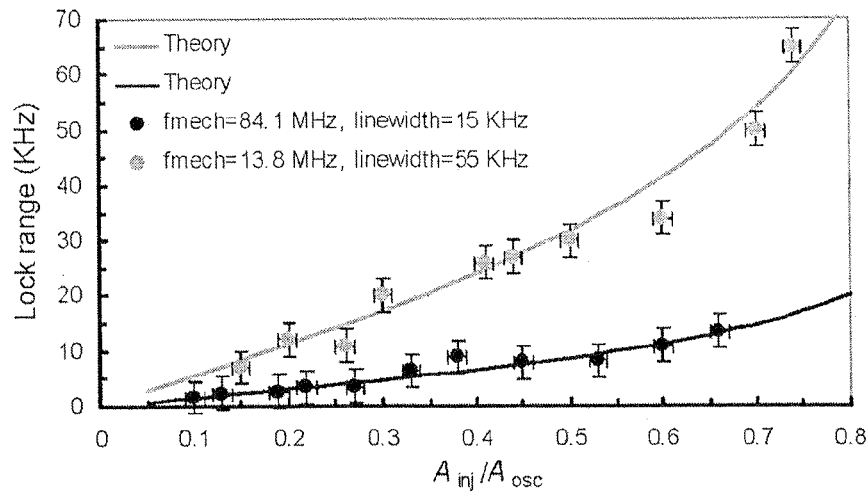
FIG. 8 is a graph showing a measured lock range plotted against the ratio between the modulation amplitude and optomechanical oscillation amplitude ($A_{inj}/A_{OMO}$) for two different optomechanical oscillators that operate according to principles of the invention.
Figure 9:
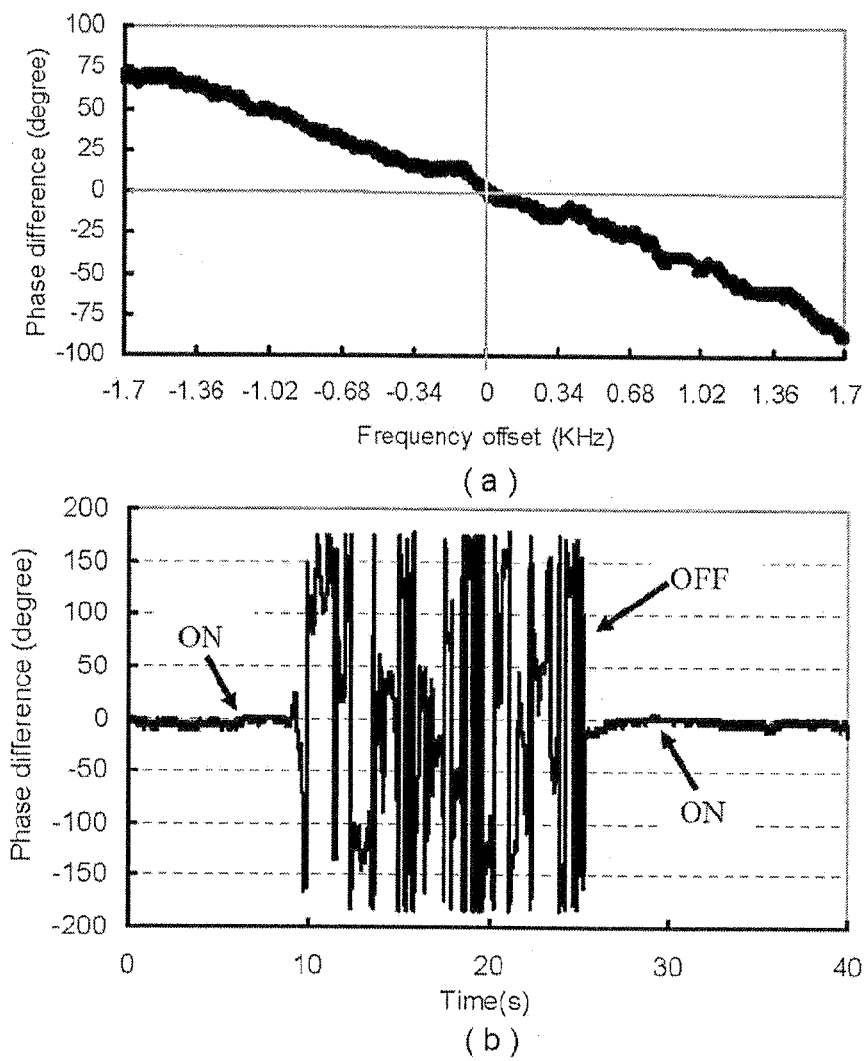
FIG. 9(a) is a graph showing a measured phase difference between the injection signal and optomechanical oscillator (OMO) in the vicinity of optomechanical oscillation frequency ($f_{OMO}$), for a microtoroidal optomechanical oscillator that operates according to principles of the invention.
FIG. 9(b) is a graph showing the temporal behavior of the phase difference in the presence (ON) and absence of external modulation (OFF) when $f_{OMO}=f_{inj}$.

FIG. 8 shows the measured lock range as a function of $A_{inj}/A_{OMO}$ for two different optomechanical oscillators: one with $f_{OMO}$=13.8 MHz and $\Delta f_{mech}$=55 KHz and the other with $f_{OMO}$=84.1 MHz and $\Delta f_{mech}$=15 KHz. The solid lines are the theoretical prediction based on Eq. (1). FIG. 9(a) shows the measured phase difference between the injection signal and OMO (measured using the lock-in amplifier), plotted against frequency detuning ($f_{OMO}-f_{inj}$) within a 3.4 KHz bandwidth around $f_{OMO}$. In this measurement $f_{OMO}$=13.8 MHz, $\Delta f_{mech}$=55 KHz and $A_{inj}/A_{OMO}$=0.36. FIG. 9(b) shows the temporal behavior of the phase difference at $f_{OMO}$=$f_{inj}$ in the presence (ON) and absence (OFF) of the injection signal on the MZ modulator. Since $f_{OMO}$=$f_{inj}$, the phase difference is locked to zero. As is evident from the trace, the phase difference remains close to zero when injection is ON and becomes random when injection is OFF. As a result, for $f_{inj}$ within the lock range, the phase difference between the injected signal and the oscillation can be tuned by adjusting the frequency detuning.

Figure 10:
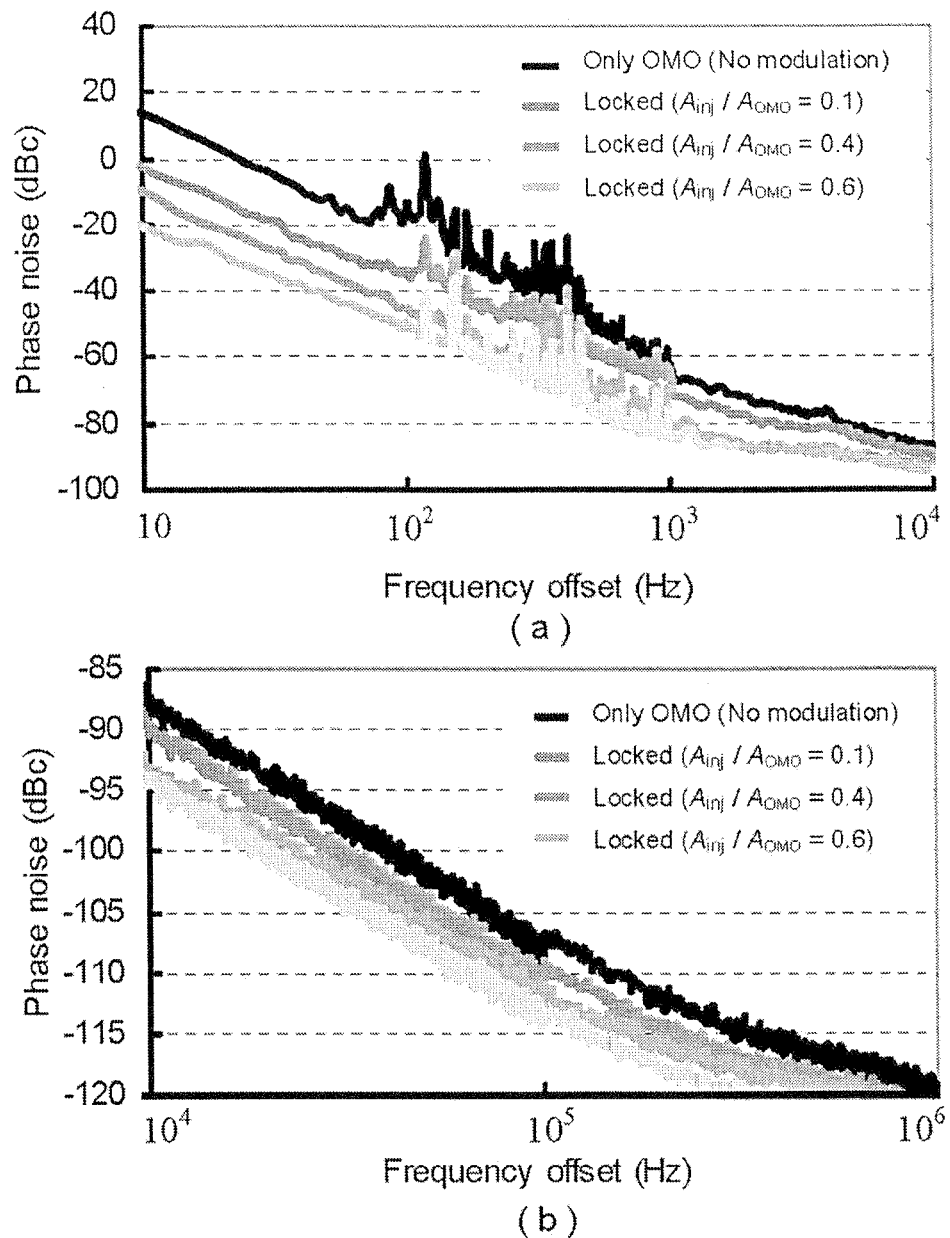
FIG. 10(a) is a graph showing the measured phase noise spectral density of the detected optical power for the 0.01-10 KHz frequency range.
FIG. 10(b) is a graph similar to that shown in FIG. 10(a) for the 10-1000 KHz frequency range.

The phase noise of the optomechanical oscillation under injection was also investigated. The presence of the locking signal improves the OMO phase noise. FIG. 10(a) is a graph showing the measured phase noise spectral density of the detected optical power for the 0.01-10 KHz frequency range and FIG. 10(b) is a similar graph for the 10-1000 KHz frequency range. The phase noise is measured for the free-running OMO and injection-locked OMO with $A_{inj}/A_{OMO}$=0.1, 0.4 and 0.6 (lowest curve in FIG. 10(a), next lowest curve, and second highest curve, respectively). As evident from the noise spectra, the phase noise improvement is especially noticeable in the low frequency range (<10 KHz, FIG. 10(a)). This is believed to occur because frequency locking eliminates the frequency jitter caused by slowly-varying noise mechanisms. These measurements also verify that the magnitude of the phase noise improvement scales as $A_{inj}/A_{OMO}$.

Figure 11:
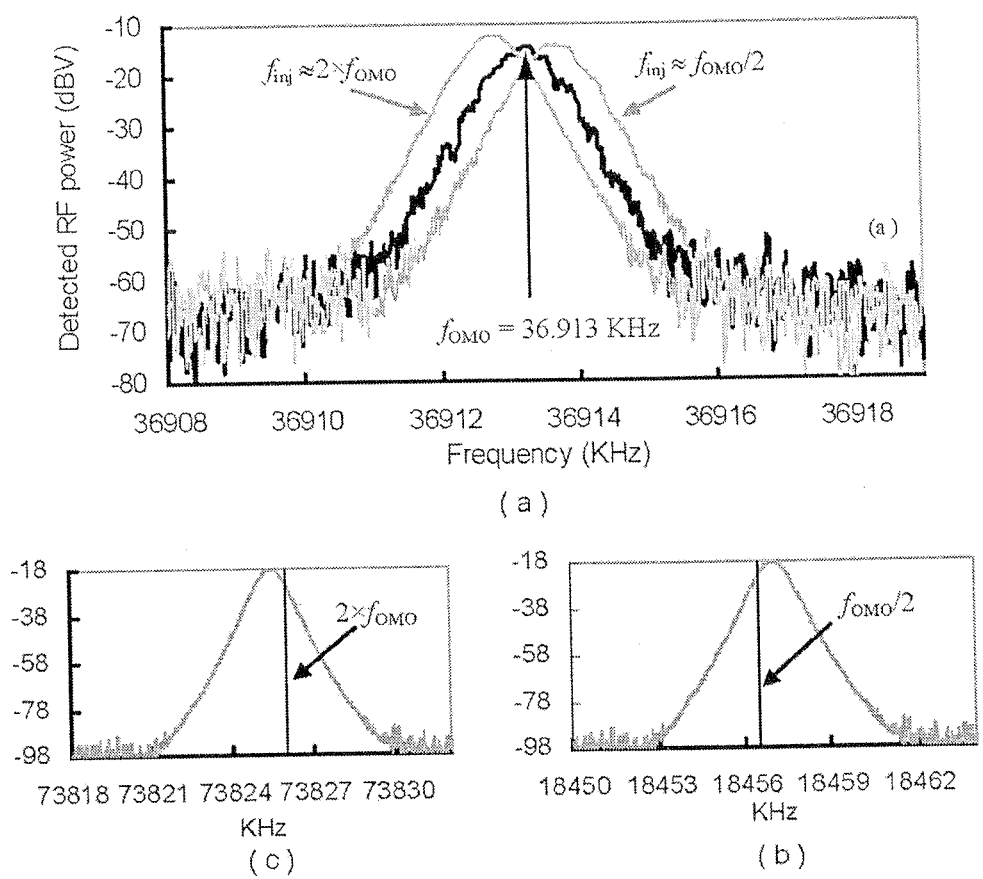
FIG. 11(a) is a graph of the measured RF spectrum of the free running OMO (black trace) and the OMO locked to sub-harmonic and harmonic injected signals (gray traces).
FIG. 11(b) and FIG. 11(c) are the spectra of the harmonic and sub-harmonic injected signals respectively.

We have also verified that, as is also true with electronic oscillators, the OMO can be injection locked to a signal with a frequency close to harmonic or sub-harmonic frequencies of the fundamental oscillation frequency ($f_{OMO}$). FIG. 11(a) shows the RF spectrum of the free running OMO (black trace) as well as harmonically and sub-harmonically locked oscillator (gray traces). In this study $f_{OMO}$=36.913 MHz. FIG. 11(b) and FIG. 11(c) show the RF spectra of the modulating (injected) signals for the two locked cases shown in part (a). The black vertical lines indicate the location of the second harmonic ($2 \times f_{OMO}$) and sub-harmonic ($f_{OMO}/2$) of the main oscillation frequency. As is evident from the graphs, injecting the OMO at these frequencies can also lock the frequency of the OMO to the modulating signal. The injected signals are intentionally detuned from the exact harmonic and sub-harmonic so that the frequency locking is clearly observable in the vicinity of $f_{OMO}$.

In conclusion we have shown that injection locking technique can be used to lock the phase and frequency of an optomechanical oscillator to amplitude modulation of an input optical wave. This technique, widely used in conventional electronic and conventional photonic systems, is expected to provide interesting frontiers in engineering of optomechanical RF oscillators and their applications. As an example, recently a photonic RF-receiver architecture based on the OMO has been demonstrated that can benefit from this phenomenon.

In this design the locking between the optomechanical local oscillator and the received signal may relax the frequency stability requirement for the oscillator within the lock range. Injection locking of an optomechanical oscillator to an electronic RF oscillator enables combination of OMO with electronic devices and may have interesting applications in certain RF-photonics and micro opto-electro-mechanical systems (MOEMS). Alternatively the non-electronic nature of OMO makes them immune to electromagnetic interference and good candidates for all-optical systems. In this context injection locking can be used to lock two optomechanical oscillators and improve the frequency stability and noise performance of the "slave" oscillator. Lastly injection locking is a useful feature in metrological applications where it can be used to synchronize multiple OMOs as well as controlling optomechanical oscillations with atomic accuracy (by locking to atomic clocks).

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An optomechanical RF frequency converter, comprising:
    a microtoroid optomechanical oscillator configured to provide a self-generated RF local oscillation frequency and configured to provide a RF mixing functionality, said microtoroid optomechanical oscillator having an optical input port configured to receive an optical signal having an optical frequency carrier and an RF frequency sub-carrier that carries a lower frequency single-tone, modulated thereon, and an optical output port configured to provide an optical signal modulated with said low frequency single-tone without said RF carrier.

2. The optomechanical RF frequency converter of claim 1, wherein said optical input port configured to receive an optical signal is an optical input port configured to receive an optical signal comprising an injection frequency component that is configured to lock at least one of a frequency and a phase of said microtoroid optomechanical oscillator to a respective at least one of a frequency and a phase of said injection frequency component.

3. The optomechanical RF frequency converter of claim 2, wherein, in response to the provision of an optical signal comprising an injection frequency component that is configured to lock at least one of a frequency and a phase of said microtoroid optomechanical oscillator to a respective at least one of a frequency and a phase of said injection frequency component at said optical input port, said microtoroid optomechanical oscillator is constrained to operate at a respective at least one of a frequency and a phase of said injection frequency component.

4. The optomechanical RF frequency converter of claim 1, wherein said microtoroid optomechanical oscillator comprises silica.

5. The optomechanical RF frequency converter of claim 1, in combination with:
    a signal source configured to provide a signal representing information to said input port of said microtoroid optomechanical oscillator, said signal comprising an optical carrier frequency and information provided in an RF signal having a RF carrier and baseband frequency where said RF carrier frequency is equal to an optomechanical oscillation frequency of said microtoroid optomechanical oscillator;
    a photodetector having a bandwidth matched to said baseband frequency, said photodetector configured to receive an output signal from said output port of said microtoroid optomechanical oscillator, and configured to provide as output an electrical signal representative of said information; and
    an electrical apparatus configured to receive said electrical signal representative of said information and configured to perform a selected one of recording said information and displaying said information.

6. The optomechanical RF frequency converter of claim 1, wherein said optomechanical RF frequency converter is configured to receive an optical signal having an optical frequency carrier and an RF frequency sub-carrier that carries a lower frequency single-tone representing information modulated thereon, in combination with:
    a photodetector having a bandwidth matched to said baseband frequency, said photodetector configured to receive an output signal from said output port of said microtoroid optomechanical oscillator, and configured to provide as output an electrical signal representative of said information; and
    an electrical apparatus configured to receive said electrical signal representative of said information and configured to perform a selected one of recording said information and displaying said information.

7. The optomechanical RF frequency converter of claim 6, in combination with said photodetector and said electrical apparatus, wherein said combination comprises an RF receiver.

* * * * *